United States Patent [19]
Lindblad

[11] 3,982,775
[45] Sept. 28, 1976

[54] DEVICE FOR TIGHTENING OF A BELT FORMING PART OF A SAFETY HARNESS ASSEMBLY FOR VEHICLES

[76] Inventor: Oskar Lennart Lindblad, Hedasgatan 16, 77020 Vargarda, Sweden

[22] Filed: Jan. 24, 1975

[21] Appl. No.: 544,000

Related U.S. Application Data

[62] Division of Ser. No. 326,135, Jan. 23, 1973, Pat. No. 3,879,054.

[30] Foreign Application Priority Data
Jan. 28, 1972 Sweden.................................. 958/72

[52] U.S. Cl................................. 280/744; 280/746
[51] Int. Cl.²......................................... B60R 21/10
[58] Field of Search ............................. 280/150 SB

[56] References Cited
UNITED STATES PATENTS
| | | | |
|---|---|---|---|
| 3,022,089 | 2/1962 | Botar.............................. | 280/150 SB |
| 3,804,430 | 4/1974 | Fiala............................... | 280/150 SB |

FOREIGN PATENTS OR APPLICATIONS
| | | | |
|---|---|---|---|
| 1,258,697 | 3/1961 | France .......................... | 280/150 SB |

*Primary Examiner*—Robert R. Song
*Attorney, Agent, or Firm*—Ulle C. Linton

[57] ABSTRACT

An arrangement for tightening a belt forming part of a vehicle safety harness assembly when abnormal changes of speed of the vehicle occur such as in the case of a collision involving the vehicle.

9 Claims, 7 Drawing Figures

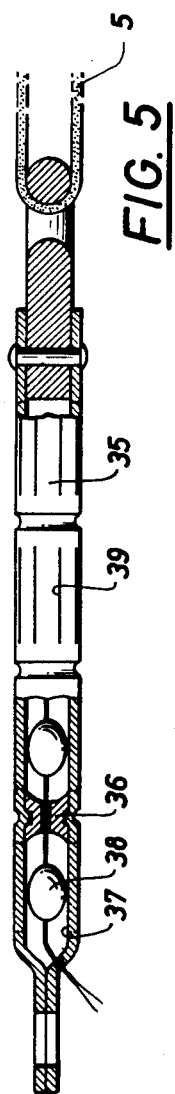
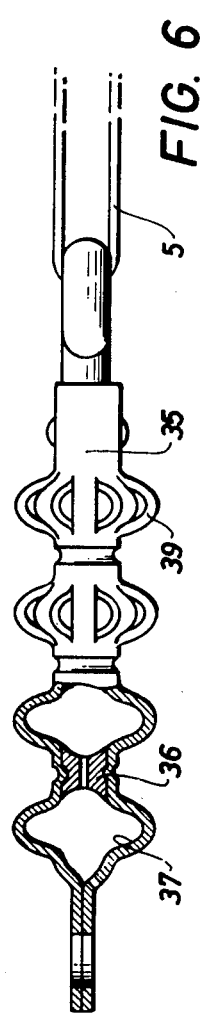
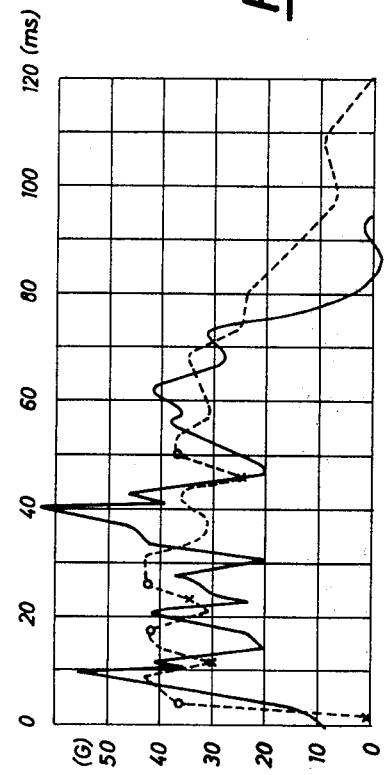
FIG. 5
FIG. 6
FIG. 7

DEVICE FOR TIGHTENING OF A BELT FORMING PART OF A SAFETY HARNESS ASSEMBLY FOR VEHICLES

The present application is a divisional from my co-pending application Serial No. 326,135 filed Jan. 23, 1973, now Pat. No. 3,879,054.

In safety harness of the prior art it is necessary that the belt entering into the assembly lies against the person using the safety belt in question, thereby exercising a pressure which is often felt as annoying by the person in question which has as a consequence that the belt is not used as often as it should.

It is the principal object of the invention to provide a device which makes it possible to tighten the belt in a loosley fitting safety harness assembly when unnormal changes of speed of the vehicle take place, as by way of example in case of a collision.

This object has been obtained by means of the device according to the invention substantially being characterized by the combination of a sensor means feeling said change of speed, a latch device detached by actuation of said sensor means and a power means connected with said belt which power means is activated by the detachment of said latch device, thereby in such activated condition producing said tensioning.

Figure 1:
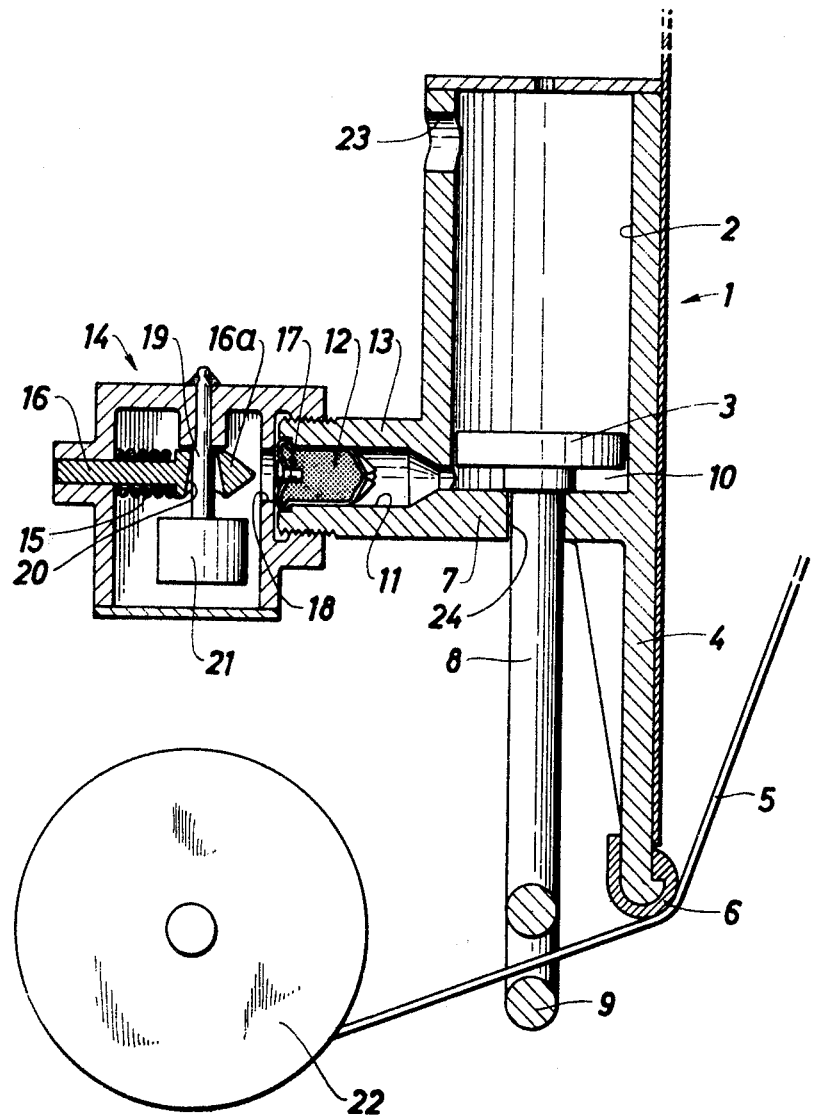
Figure 2:
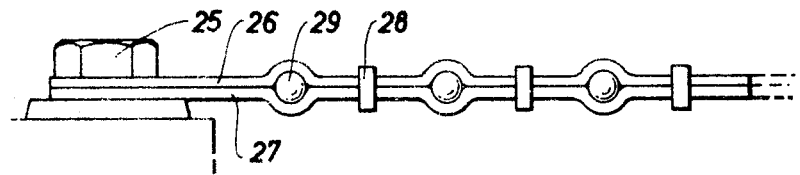
Figure 3:
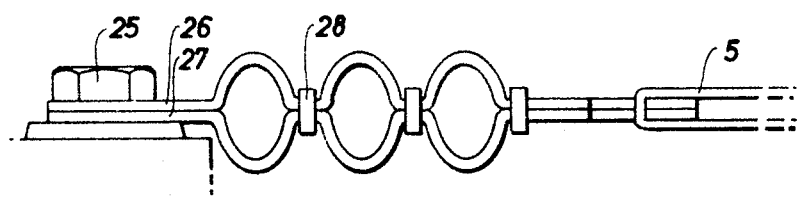
Figure 4:
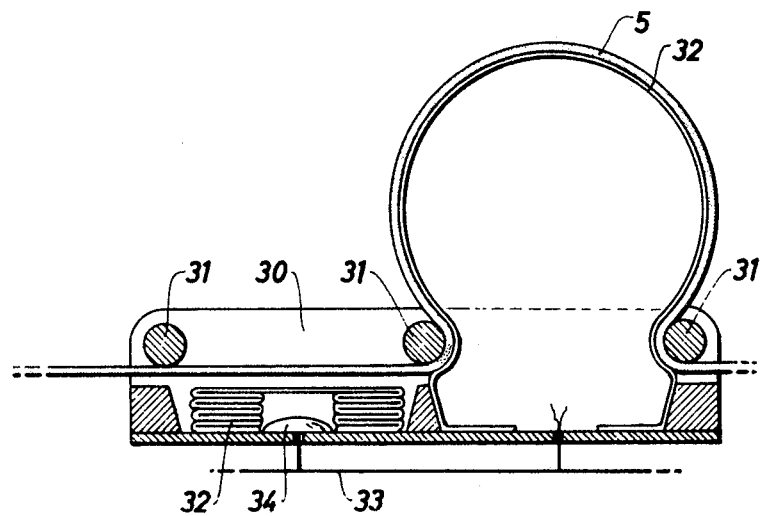

The object of the invention will now be described with reference the the accompanying drawings in which FIG. 1 illustrates in crosssection a first example of an embodiment of a tightening device according to the invention, FIG. 2 illustrates a second example of embodiment of a tightening device according to the invention in idle condition, FIG. 3 illustrates the tensioning device illustrated in FIG. 2 in activated condition, FIG. 4 illustrates a third example of embodiment of a tightening device according to the invention in partly activated condition, FIG. 5 illustrates a fourth variant of embodiment of the tightening device according to the invention in idle condition, FIG. 6 illustrates the tightening device illustrated in FIG. 5 in activated condition, and FIG. 7 is a diagram showing the relation between the deceleration of the vehicle and the deceleration of the chest of a test doll placed in the vehicle, the curve indicated by a continuous line referring to the vehicle and the curve indicated by a broken line referring to the doll. The tightening detonations are indicated at an x and the tensioning pulses are indicated at an o.

The tightening device illustrated in FIG. 1 comprises a housing 1 which exhibits an inner cylindrical hollow chamber 2 in which a piston 3 is fitted in displaceable mounting. A part projecting from the housing 1 is indicated at 4, over which part the belt 5 to be tightened is running. In order to avoid unnecessary wear of the belt, the edge portion of the projecting part, against which the belt is running is provided with a suitable lining 6. Through one wall 7 of the housing 1, a piston rod 8 is, extending, being fastened to the piston 3 at one end and having a pusher 9 at its other free end. In the idle condition illustrated in the drawing, the pusher 9 is positioned on the side of the belt turned away from the piston 3, whereby the belt during an upwards displacement according to the drawing is carried along, thereby forming a loop with the portion 10 of the cylinder space defined by the piston and located at the underside thereof, a bore 11 is communicating in which a gun-powder charge 12 or similar is placed, serving the purpose as a pressure generating means. The bore 11 is made in connecting branch 13, constituting an integrated part of the housing 1, a second housing 14 being screwed on the free end of said connecting branch, said second housing 14 taking up a striking pin 16 biased by means of a helical spring 15. The striking pin 16 is located in coaxial relation to the gun-powder charge 12, and the pointed end portion of said striking pin 16 is indicated at 16a and is placed right in front of the fuse 17 of the gun-powder charge 12, and in this manner via an opening 18 of the wall of the housing 14 it can reach said fuse 17. Normally the striking pin is kept in the idle position illustrated in the drawing by means of a bar 19 connected to the wall of the housing 14, said bar being made of comparatively brittle material and extending through a preferably tapered bore 20 of the striking pin. At its free end the vertical bar 19 supports a weight 21 serving the purpose of a body of inertia. A belt roll entering into the safety harness assembly is indicated at 22, said roll during the use of the safety belt or at least in case of unnormal changes of the speed of the vehicle being blocked, thus not being is a position to be rotated in the winding off direction.

When an unnormal change of the speed of the vehicle takes place as in the case by way of example in a collision, the body of inertia 21 receives a pivoting movement which has the result that the brittle bar 19 is broken and the striking pin 16 biased by the spring 15 is penetrating into the charge 12 of the fuse 17 and activates said charge. By the detonation of the charge 12 and increased pressure is created in the bore 11 and the space 10 which results in an upwards displacement of the piston 3 and the belt 5 is carried along with the pusher 9 in its upwards movement. By the fact that the upper portion of the cylinder chamber 2 is in open communication with the surrounding air via a bore 23, the upwards movement of the piston will not be counteracted which means that an efficient tightening of the belt 5 is obtained. In the embodiment illustrated in FIG. 1 the piston 8 is conducted through the wall 7 of the housing exhibiting a certain play whereby the pressure medium existing in the space 10 is permitted to flow out at a low speed through the annular passage 24 shaped by said play. Thereby a dampened return of the belt 5 to its original position is obtained which means a smooth catching of the person using the safety belt.

It is also possible to place one or several closed cells in the belt of the safety belt assembly, which cells communicate with the space in which a pressure generating agent, by way of example made like the gun-power charge 12, is located, said cells being flexible, constituting spaces of expanding volume, which spaces, when they expand cause a deflection of the belt thereby tensioning the same. The belt can for example be of a double-ply type with said cells laid in between portions of the belt placed on top of each other and sewn together.

It is also within the scope of the invention to make a tightening device which works completely mechanically. In this case a strong spring can be used for performing the tightening operation itself instead of the expanding space indicated at 10 in FIG. 1.

The tightening device illustrated in FIGS. 2 and 3 comprises a long fitting, to one end of which the belt 5 of the safety harness assembly is coupled, and the other end of which is anchored at a fixed point in the vehicle by means of a bolt 25. The fitting comprises two in between them parallel strips of sheet metal 26 and 27 respectively which in addition by the belt 5 and the bolt 25 are held together by means of a number interspaced clips 28 or similar. Between the points at which the strips 25 and 27 are kept together the strips are bent out each one in a direction opposing the other and in each one of the interspaces thus shaped there is charge 29 or similar which can expand, thereby causing bulging of the portions of the metal strips located between the fastening points resulting in the condition illustrated in FIG. 3 in which a considerable shortening of the fitting has taken place after the charges 29 have been activated by a sensor device reacting upon a sudden change of the speed of the vehicle.

The tightening device illustrated in FIG. 4 comprises a holder 30 through which the belt 5 intended for tightening is thread. At one side of the belt there are a number of pins 31 extending in the crosswise direction of the belt and interspaced in the longitudinal direction of the belt. At the opposite side of the belt in each of the interspaces there is a normally bellow shaped expanding container 32 mounted which contains a charge 34 which can be activated by actuation via an electric circuit system 33. In the activated condition of the charge 34 the container is expanded and presses up the belt 5 between the pins 31 as is shown to the right in FIG. 4.

The tensioning device illustrated in FIGS. 5 and 6 comprises a fitting which is made of a tube which at one end 35 is flattened and in which a number of crosswise extending interspaced walls 36 are arranged which separate a number of spaces 37 each one containing an expanding charge 38. The side walls of each of the spaces 37 are provided with slits 39 extending in the longitudinal direction of the tube which slits make an expansion of the spaces in question possible, when the charges 38 are activated, during which expansion a deformation of the walls takes place to the shape illustrated in FIG. 6. In this condition a shortening of the fitting has taken place which also results in a tightening of the belt 5 connected with the fitting.

It is possible to let the tightening of the belt take place by activating the charges one after another in series. It has turned out that the human body can stand comparatively high stresses during very short intervals of time. By means of the tensioning devices according to FIGS. 2 - 6 a dividing up of the tightening moment into a series of rapidly after one another following pulls with a certain relax between each pull has been made possible. Thereby a "pumping effect" is obtained which in each separate tightening moment amounts to a predetermined maximum level of such short duration that damages to the person using the vehicle cannot be caused. By instantaneous tightening of the belt entering into the safety belt assembly immediately after the collision movement, the time during which the vehicle by deformation spends its kinetic energy and comes to a standstill, is utilized. The retardation of the passenger compartment in this connection takes place relatively slowly and the traveller is braked by his safety belt only, when the fastening points of the belt move forward slower than the traveller and a compression of loosely fitting clothes thereafter has taken place. If this tightening is obtained by means of one single charge of gas as is the case in the tightening device according to FIG. 1, the speed at which an activation takes place and duration of the discharge is calibrated with an upper limit of the tolerance value of the body which means that the tightening must be relatively strong at the same time as it takes place with a certain slowness. By providing the tightening for example by means of a series of a gas discharges the speed at which the stress is applied can be increased without critical values being executed. It is further possible to variate the strength of each individual gas discharge as well as also the intervals between the different discharges, so that the curve for the deformation characteristic of the individual vehicle is calibrated in such a way that a strong tightening of the belt of the safety belt assembly does not take place at the same time as the retardation of the vehicle reaches its maximum value. The device illustrated in FIGS. 2 - 6 makes moreover possible a variation of the degree of tightening as well as the tightening force with to such factors as the weight of the traveller, the position of the driver's seat, the speed of the vehicle, etc., by under the utilization of different feeling devices and coupling circuits let only certain of the gas discharges take place. Said feeling devices can preferably work with the delay in order to eliminate the risk of coupling away charges by occasional decrease of the load on the seat as for instance due to the braking.

By stretching of only a certain section or sections of a belt in a determined order by turn, one can obtain considerable advantages in different types of accidents or collision courses, by way of example a collision diagonally from the side, a collision from behind or a turning over of the vehicle. As a suggestion this can be obtained by coupling several sensor means placed at different points of the vehicle to a circuit system in which they interact so that a tightening will take place only at the most advantageous points of the belt relative to the course of the accident, i.e. only charges at the points in question are activated.

The invention is not limited to the embodiments described above and illustrated in the drawings by way of example only, but can be relatively slow return stroke of said piston and a corresponding slow prolongation of the belt to its original condition.

I claim:

1. A device for the tightening of a belt forming part of a safety harness assembly of a safety belt for vehicles in case of abnormal changes of speed of the vehicle, as for example during a collision, comprising a safety belt part, a sensor means capable of sensing said abnormal speed changes and giving off a gaseous pressure pulse in its activated condition, a power means capable of being driven by said gaseous pressure pulse and in its activated condition capable of giving at least one portion of said belt part a movement in a sidewards direction relative to the normal extension of said belt part thus forming at least one sidewards directed loop, said power means comprises a number of gas charges which can expand and said belt part having inner spaces along the longitudinal direction of said belt to be tightened, said charges being arranged in said belt inner spaces with at least one of the sides of said charges being adjacent said belt in such a way that said belt is deflected sidewise thereby contracting in the pulling direction when any of said charges are activated.

2. Device according to claim 1, including two band shaped sheet metal strips extending in the longitudinal direction of said belt part and forming an extension of the same which strips are held together at points located therealong and said charges being positioned between said points.

3. Device according to claim 1 including a tube forming an extension of said belt and containing a number of compartments in between them separated by tranversally extending walls each one containing one of said charges, and the wall portion of said tube defining said compartments having a number of slits.

4. Device according to claim 1, including controlling means arranged to activate said charges in series.

5. Device according to claim 4, including means for feeling the weight of the person sitting on the seat in question so adjusted that a number of said charges corresponding to the weight are activated.

6. Device according to claim 5, wherein said feeling devices being arranged to work with a delay.

7. A device for the tightening of a belt forming part of a safety harness assembly of a safety belt for vehicles in case of abnormal changes of speed of the vehicle, as for example during a collision, comprising a safety belt part, a sensor means capable of sensing said abnormal speed changes and giving off a gaseous pressure pulse in its activated condition, a power means capable of being driven by said gaseous pressure pulse and in its activated condition capable of giving at least one portion of said belt part a movement in a sidewards direction relative to the normal extension of said belt part thus forming at least one sidewards direction loop, a number of fixed transverse guide bridges interspaced in the longitudinal direction of said belt part and extending crosswise relative to said belt part, a number of gas containers positioned between said guide bridges which are positioned at the one side of said belt and arranged in such a way that in their expanded condition they can press out a portion of said belt part between said guide bridges thus producing a tightening of said belt.

8. A device as claimed in claim 7 wherein said guide bridges are each a pin.

9. A device as claimed in claim 7 wherein said power means is a bellows and said sensor means includes an electrically operable charge in said bellows.

* * * * *